April 19, 1955   D. H. CLEWELL   2,706,805
EDDY CURRENT SEISMOMETER
Original Filed Feb. 11, 1947   2 Sheets-Sheet 1
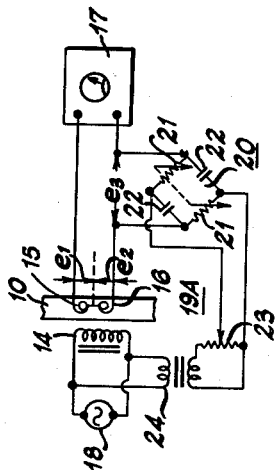
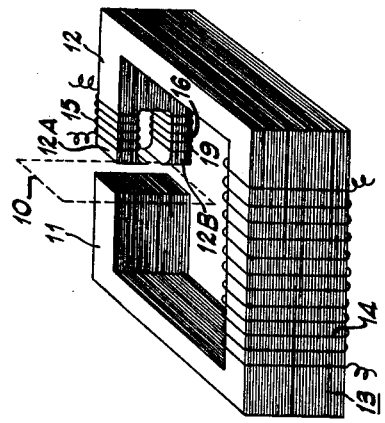
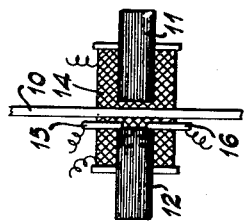
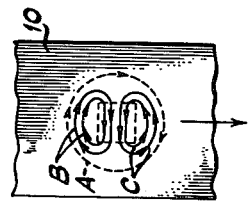
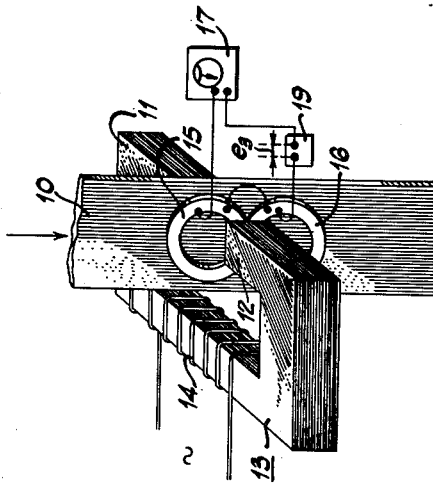
DAYTON H. CLEWELL
INVENTOR.
BY Sidney A. Johnson
ATTORNEY April 19, 1955 D. H. CLEWELL 2,706,805
EDDY CURRENT SEISMOMETER
Original Filed Feb. 11, 1947 2 Sheets-Sheet 2
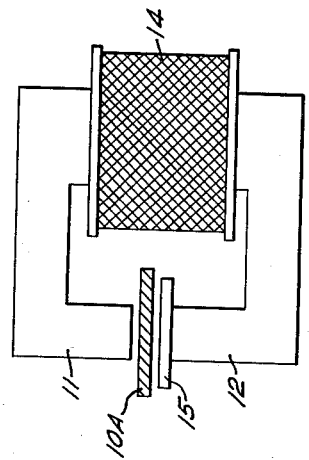
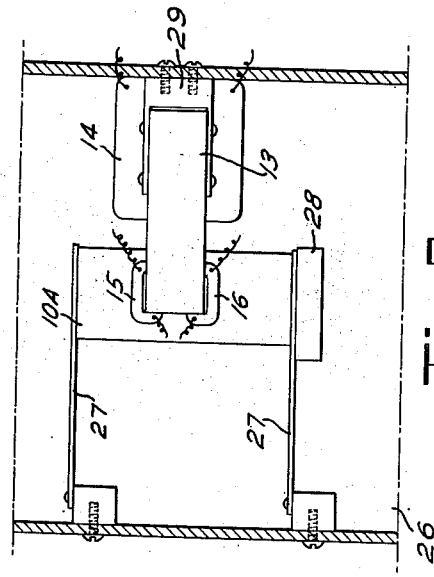
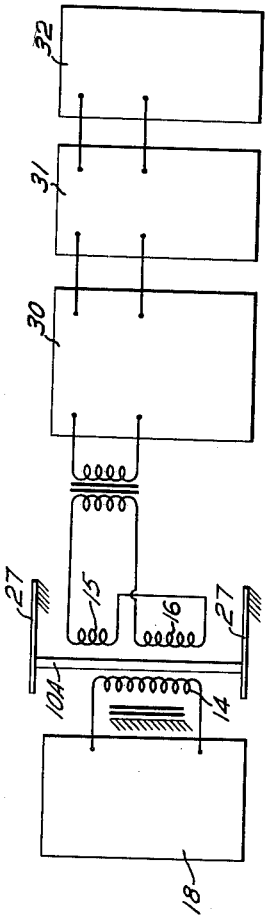
INVENTOR
DAYTON H. CLEWELL
BY
Sidney A. Johnson
ATTORNEY

United States Patent Office 2,706,805
Patented Apr. 19, 1955

2,706,805

EDDY CURRENT SEISMOMETER

Dayton H. Clewell, Dallas, Tex., assignor, by mesne assignments, to Socony-Vacuum Oil Company, Incorporated, New York, N. Y., a corporation of New York Original application February 11, 1947, Serial No. 727,798. Divided and this application November 29, 1949, Serial No. 130,010

3 Claims. (Cl. 340—17)

This invention relates to methods and systems involving the determination of the velocity of a conductor such as a metal strip resiliently mounted as the stationary element in a seismometer for the detection of seismic waves.

This application is a division of co-pending application Serial Number 727,798, filed by applicant February 11, 1947, and now abandoned without prejudice to this application, for Methods and Systems for Measuring Velocity of a Conductor.

Generally, in accordance with the invention, there is produced a magnetic field which traverses the moving conductor to induce eddy currents therein and the eddy currents are utilized to produce an electrical effect, specifically, a current or voltage whose magnitude varies as a function of the velocity of the conductor.

More specifically, and in accordance with one form of the invention, the eddy currents are utilized in effect to vary the magnetic coupling between a primary coil, forming a part of a seismometer, energized from a source of alternating current, and an associated secondary or pick-up coil whose induced voltage consequently includes a component whose magnitude varies in accordance with the relative velocity between a resiliently mounted conductor and the coil: preferably a pair of pick-up coils are used and are so disposed and interconnected that the variable components of their respective voltages are additive whereas the steady or zero-velocity components thereof are in opposition. The steady component of the output of a single coil pick-up or any residual steady state component of the joint output of the preferred two-coil pick-up may be cancelled by opposition thereto of an equal alternating voltage derived from or having the same frequency as the aforesaid supply source whereby the variable components or the output voltage will be proportional to the relative velocity between the resiliently mounted conductor and a seismometer case supporting the coil.

The invention further resides in methods, systems and devices having features herein disclosed and claimed.

For a more detailed understanding of the invention, reference is made to the accompanying drawings, in which:

Figure 1 is a perspective view showing the basic constructional features and circuit connections of one form of the invention;

Figure 2 is an end view of parts appearing in Figure 1;

Figure 3 is an explanatory figure referred to in discussion of the principles of operation of Figure 1;

Figure 4 is a schematic wiring diagram referred to in discussion of Figure 1 and other figures;

Figure 5, in perspective, illustrates a modified form of core structure;

Figure 6 is an elevational view, partly in section, of a seismometer embodying the invention;

Figure 7 is a plan view of parts appearing in Figure 6; and

Figure 8 is a block diagram of a geophone channel using the seismometer of Figs. 6 and 7.

Referring to Figs. 1 and 2, the strip 10 is generically illustrative of a conductor, such as a metal ribbon or strip which when resiliently mounted may form, as will hereinafter be described, the steady mass or inertia element of a vibration sensitive device such as a seismometer. The velocity of the strip 10 or the relative motion between strip 10 and the pole pieces 11 and 12 is dependent upon the driving forces or seismic waves. In this particular vibration sensitive device, the pole pieces 11 and 12 are those of a C-shaped core member 13, having thereon a coil 14 energized from a suitable source 18 of alternating current.

Assuming the conductor 10 is at rest with respect to the pole pieces 11 and 12, traverse of the conductor 10 by the alternating magnetic flux between the opposed faces of the pole pieces 11, 12 produces in the strip 10 eddy currents represented in Figure 3 by the broken-line arrows A showing the direction of flow at a particular instant; the direction, of course, reversing with each alternation of the field. These currents flow in a substantially circular path which is symmetrical about the axis of the magnetic field between the pole faces.

The magnetic fields induce in each of the pick-up coils 15 and 16, Figs. 1 and 2, respectively disposed in advance of and beyond the axis of the pole pieces, a constant voltage which depends upon design or operating constants including the coupling of these coils to the primary coil 14 as determined by their fixed position with respect to the core member 13. For reasons which later herein appear, the coils 15 and 16 are connected in series opposition so that the voltage $e1$ and $e2$, Figure 4, induced therein by the broken-line eddy currents A are in opposition and more or less completely cancel one another.

Assuming the conductor 10 is in motion relative to pole pieces 11, 12, for example moving in the direction of the arrow, Figure 1, there are produced, by the motion of conductor 10 relative to the magnetic field, two additional sets of eddy currents; one flowing in a path substantially symmetrical with respect to the upper edges of the pole faces and the other in a path substantially symmetrical with respect to the lower edges of the pole pieces. These eddy currents, respectively indicated by the solid-line arrows B and C of Figure 3, flow in opposite directions with respect to each other at each instant because the magnetic gradients are in opposite directions. The direction of the eddy currents, of course, reverses for each reversal of the field producing them. The magnitude of these eddy currents is substantially proportional to the velocity of strip 10 relative to the pole pieces, other things remaining constant. As indicated in Figure 3, the upper eddy currents B, symmetrical with respect to the upper edges of the pole pieces, are additive to the steady eddy currents represented by the broken-line arrows A whereas the lower group C of eddy currents, symmetrical with respect to the lower edges of the pole pieces, are subtractive from the steady eddy currents. Accordingly, the total voltage induced in the uppermost pick-up coil 15 comprises a steady component $e1$, corresponding to the inductive coupling of the pick-up coil with the eddy currents A, and a variable component $\Delta e$ additive thereto corresponding with the eddy currents B, with this total voltage proportional to the applied alternating magnetic field. The total voltage induced in the lower pick-up coil 16 includes a steady component $e2$ corresponding with the eddy currents A, and a variable component $\Delta e$ in opposition thereto, corresponding with the eddy currents C, with this total voltage also proportional to the applied alternating magnetic field.

When the coils 15 and 16 are connected as previously described, the steady components of the voltages induced in coils 15 and 16 mutually cancel whereas the variable components are additive so that the effective joint output ($2.\Delta e$) of the two coils is substantially proportional to the velocity of the conductor 10 and to the applied alternating magnetic field, appearing as an alternating voltage with amplitude modulation representative of the motion of strip 10.

Because of difficulties in manufacture, it is often not feasible or economical to attain complete balance or cancellation of the steady components $e1$ and $e2$ of the individual voltages of the pick-up coils 15 and 16. Any residual steady component of the joint output of the pick-up coils may, however, readily be cancelled by opposition thereto of a voltage $e3$, Figs. 1 and 4, derived from or having the same frequency as the source 18 used to energize the coil 14 of the device. The source 19, Fig. 1, of this compensating voltage $e3$ may be of any known type; as shown in Fig. 4, it may comprise a phase-shifting network 20 including resistors 21, 21 and reactances 22, 22 arranged in the form of a Wheatstone bridge. By using reactances and resistors which are of equal impedance at the frequency of source 18, a phase shift of any desired magnitude from 0° to 180° may be obtained and without change of amplitude by simultaneously and equally varying either both resistors or both reactances; for low frequencies, it is more convenient to use variable resistors whose movable elements are ganged for simultaneous adjustment. By such adjustment, the voltage $e3$ may be adjusted so that it is in phase opposition to the algebraic sum of the steady-component voltages $e1$ and $e2$ produced respectively by the pick-up coils 15 and 16. To attain a value of $e3$ which is numerically equal to the unbalance of the voltages $e1$ and $e2$, the input terminals of the bridge 20 may be connected to a voltage divider 23 having a contact adjustable to vary the input voltage to the phase-shifter 20. Preferably, and as shown, the phase-shifting network and the measuring network comprising the pick-up coils and the measuring, recording or control device 17, are isolated from the supply circuit by a step-down transformer 24. When only one pick-up coil 15 or 16 is utilized, the magnitude of voltage $e3$ is, of course, selected or adjusted to be suitably greater to effect balance.

In the modification shown in Fig. 5, the pole piece 12 is divided or split in direction normal to the direction of relative movement of conductor 10, forming two legs 12A and 12B about which the pick-up coils 15 and 16 are respectively disposed. With this construction, as compared to that of Fig. 1, the sensitivity is higher and the disturbing effect of extraneous magnetic fields from other nearby equipment is reduced.

In Figs. 6 and 7, there is illustrated a seismometer which converts earth vibrations into electrical signals useful in seismic prospecting systems in which an explosive charge is detonated and the record of the resulting seismic waves interpreted to determine the depth and contour of subterranean strata. The seismometer or geophone comprises a casing 26 suited for disposition on the surface of the ground or in a bore hole. The metal ribbon or strip 10A corresponding with strip 10 of Fig. 1 is resiliently attached to the casing 26 as by a pair of leaf springs 27 suitably connected to the upper and lower ends of the strip. To increase the inertia, a weight 28 may be attached to the free end or portion of the resiliently mounted system. The core member 13, the exciting coil 14, and the pick-up coils 15 and 16 form a unit which is rigidly attached to the casing 26 as by the bracket 29. The pick-up coils 15, 16 may be disposed on legs 12A, 12B of pole piece 12 as in Fig. 5, or may be adjacent the face of pole piece 12 as in Fig. 1.

Upon arrival of seismic waves at the seismometer location, the inertia element comprising the strip 10A will remain at rest, whereas the casing and the core member 13 will vibrate with respect thereto. In this as in the modification previously discussed, the relative motion of the conductor and the magnetic field produce in each of the pick-up coils 15, 16 a voltage whose magnitude is a function of the velocity of the conductor. The motion of the conductor between the coil 14 on one hand and the coils 15 and 16 on the other, modulates the voltage induced in the pick-up coils 15, 16 so that their output is of the same frequency as the source 18 amplitude-modulated in accordance with vibrations of the conductor.

The output voltage of the seismometer is preferably magnified by an amplifier 30 of suitable number of stages and including tuned or filter circuits which are broadly resonant at the carrier frequency; that is, the frequency of source 18, and whose band width is suitable to pass seismic wave frequencies which are generally of the order of from thirty to eighty cycles per second. The carrier frequency is substantially higher; for example, 1000 cycles per second. The output of the amplifier 30 is rectified as by the demodulator 31 and the seismic frequency output thereof is impressed upon the galvanometer 32 or other suitable recording device. Alternatively, the seismometer of Figs. 6 and 7 may be used in the measuring circuit of Fig. 4.

It shall be understood the invention is not limited to the particular embodiments disclosed but that changes and modifications may be made within the scope of the appended claims.

What is claimed is:

1. A seismometer unit for producing an electrical output representative of seismic waves comprising a casing, magnetic core structure rigidly attached to said casing and having pole pieces spaced to provide a gap, an inertia element comprising a metallic strip extending in a plane through said gap and resiliently supported at its opposite ends from said casing, exciting means for producing an alternating magnetic flux in said gap, said alternating magnetic field upon relative movement of said strip inducing therein at two spaced regions eddy currents of instantaneously opposite directions of flow and affecting the distribution of said flux in said gap, and a pair of stationary pick-up coils having their axes spaced in a direction which is normal to the flux traversing said gap, the extent of such spacing in the direction of movement of said strip being such that said stationary pick-up coils are respectively disposed adjacent said two eddy current regions of the relatively movable strip.

2. A seismometer system as in claim 1 in which the pole pieces of said magnetic core structure which define said gap have opposed pole faces of unbroken cross-section and in which the axes of coils are outside the boundaries of said pole faces.

3. A seismometer unit for producing an electrical output representative of seismic waves comprising a casing, an inertia element including a metallic strip resiliently attached to said casing for vibration bodily with respect thereto, magnetic core structure rigidly attached to said casing and having pole pieces whose opposed faces define a gap through which said strip passes, one of said pole pieces being split in direction normal to the axis of vibration of said strip to provide legs, means for producing in said gap an alternating field at a frequency higher than those of said seismic waves, said field inducing eddy currents in said metallic strip, and a pair of coils respectively disposed on said legs for induction of voltages therein by the magnetic fields of said eddy currents, and means for connecting said coils in series opposition to produce a joint output substantially proportional to the velocity of said strip.

References Cited in the file of this patent

UNITED STATES PATENTS

| Number | Name | Date |
| --- | --- | --- |
| 2,104,131 | Matthews | Jan. 4, 1938 |
| 2,130,213 | Wolf | Sept. 13, 1938 |
| 2,155,267 | Hathaway | Apr. 18, 1939 |
| 2,269,453 | Gayhart | Jan. 13, 1942 |
| 2,296,754 | Wolf | Sept. 22, 1942 |
| 2,372,056 | Broding | Mar. 20, 1945 |
| 2,405,185 | Benioff | Aug. 6, 1946 |
| 2,469,137 | Strong | May 3, 1949 |